US007290770B2

(12) United States Patent
Kasuya

(10) Patent No.: US 7,290,770 B2
(45) Date of Patent: Nov. 6, 2007

(54) METAL LAMINATE GASKET

(75) Inventor: Tadashi Kasuya, Tokyo (JP)

(73) Assignee: Ishikawa Gasket Co., Ltd., Tokyo (JP)

( * ) Notice: Subject to any disclaimer, the term of this patent is extended or adjusted under 35 U.S.C. 154(b) by 130 days.

(21) Appl. No.: 11/328,201

(22) Filed: Jan. 10, 2006

(65) Prior Publication Data

US 2006/0163819 A1    Jul. 27, 2006

(30) Foreign Application Priority Data

Jan. 27, 2005    (JP) ............................ 2005-020284

(51) Int. Cl.
 *F02F 11/00*    (2006.01)
(52) U.S. Cl. ...................... 277/592; 277/593; 277/595; 277/600
(58) Field of Classification Search ........ 277/592–595, 277/600, 601
 See application file for complete search history.

(56) References Cited

U.S. PATENT DOCUMENTS

| | | | | |
|---|---|---|---|---|
| 4,468,044 A | * | 8/1984 | Ulmer et al. ................ | 277/596 |
| 4,739,999 A | * | 4/1988 | Ishii et al. .................. | 277/595 |
| 4,807,892 A | * | 2/1989 | Udagawa ..................... | 277/595 |
| 5,009,438 A | * | 4/1991 | Udagawa ..................... | 277/595 |
| 5,058,908 A | * | 10/1991 | Udagawa ..................... | 277/595 |
| 5,161,809 A | * | 11/1992 | Matsushita et al. ......... | 277/601 |
| 5,255,926 A | * | 10/1993 | Udagawa ..................... | 277/595 |
| 5,435,575 A | * | 7/1995 | Udagawa ..................... | 277/592 |
| 5,899,462 A | * | 5/1999 | Udagawa ..................... | 277/593 |
| 5,957,463 A | * | 9/1999 | Inamura ..................... | 277/593 |
| 6,347,801 B1 | * | 2/2002 | Nakamura ................... | 277/598 |
| 6,758,479 B2 | * | 7/2004 | Miyaoh ....................... | 277/598 |
| 2003/0085530 A1 | * | 5/2003 | Miyaoh et al. ............. | 277/593 |
| 2005/0179210 A1 | * | 8/2005 | Sueda ........................ | 277/592 |

* cited by examiner

*Primary Examiner*—Alison K Pickard
(74) *Attorney, Agent, or Firm*—Manabu Kanesaka

(57) ABSTRACT

A metal gasket for an internal combustion engine includes a first metal plate with a folded portion; a ring member with a sandwiched portion having a sealing bead and an extension portion, with the sandwiched portion being sandwiched in the folded portion to provide a primary sealing portion; a second metal plate laminated to the folded portion of the first metal plate so as to sandwich the extension portion to provide a secondary sealing portion; and a third metal plate sandwiched between the first metal plate and the second metal plate in a portion of the gasket separate from the sandwiched extension portion. In the event that the cylinder head lift becomes greater than the following capability of the sealing bead in the primary sealing portion, the secondary sealing portion provides excellent following capability relative to the lift.

11 Claims, 1 Drawing Sheet

METAL LAMINATE GASKET

BACKGROUND OF THE INVENTION AND RELATED ART STATEMENT

The present invention relates to a metal laminate gasket to be installed between a cylinder head and the cylinder block of an internal combustion engine, to seal therebetween. More specifically, the present invention relates to a metal laminate gasket whose secondary sealing portion is reinforced.

Recently, with the high performance of an engine, maximum explosion pressure has a tendency to rise. Especially, in a diesel engine, the maximum explosion pressure has a significant tendency to rise. On the other hand, with the reduction in weight of the engine, the mechanical strength has a tendency to decline. As a result, at the time of the explosion inside the cylinder, the lift of a cylinder head becomes large, and the following capability of a cylinder head gasket for the lift is required.

However, for example, in a conventional metal laminate cylinder head gasket wherein a primary sealing portion including a sealing bead around a combustion-chamber hole is formed, the amount of compression of the sealing bead is essentially not large compared to the lift. As a result, the following capability for the lift whose size just grew larger cannot be ensured so that an additional following capability is required. Specifically, in addition to the primary sealing portion with large heat resistance around an existing combustion-chamber hole, the secondary sealing portion with excellent following capability for a large lift of the cylinder head and excellent heat resistance is provided. Accordingly, the following capability when the cylinder head is widely lifted is required to be ensured.

Also, with the securing of the following capability of the secondary sealing portion when the cylinder head is widely lifted, it is required that load balance relative to the primary sealing portion, secondary sealing portion, and sealing portions around various types of holes such as a water hole and oil hole whose circumferences should be sealed should be appropriately distributed.

A technical problem addressed by the present invention is to provide a metal laminate gasket whose following capability relative to the lift of the cylinder head at the time of the explosion inside the cylinder is improved. Other technical problems addressed by the present invention are to provide a metal laminate gasket whose following capability when the cylinder head is largely lifted is secured by the secondary sealing portion with heat resistance and at the same time, the load balance relative to the primary sealing portion, secondary sealing portion, and the sealing portions around various types of holes whose circumferences should be sealed is appropriately distributed.

Further objects and advantages of the invention will be apparent from the following description of the invention.

SUMMARY OF THE INVENTION

In order to solve the above-described problems, a metal laminate gasket of the present invention is formed by laminating multiple metal plates, and includes a combustion-chamber hole corresponding to a combustion chamber of a cylinder block and a hole corresponding to a fluid hole whose circumference should be sealed.

In the rim of the combustion-chamber hole, the first metal plate constituting an outer plate of one side of the gasket is folded back, and a sandwiched member which at least includes a bore ring with an extension portion projecting outside of the folded portion of the first metal plate, is sandwiched in the folded portion of the first metal plate. At the same time, the second metal plate constituting the other outer plate is laminated on the surface of the folded side of the first metal plate. The extension portion in the bore ring is sandwiched between the first metal plate and the second metal plate. At the same time, a third metal plate is sandwiched in the range of not overlapping with the bore ring.

A bead whose height is higher than one or the other surface of the folded place of the first metal plate is provided in at least one of the first and second metal plates in the place wherein the extension portion of the bore ring is sandwiched. A primary sealing portion is formed by the folded place of the first metal plate sandwiching the sandwiched member. A secondary sealing portion is formed by the first and second metal plates in the place where the extension portion of the bore ring is sandwiched. The total thickness of the first and second metal plates, and the bore ring in the secondary sealing portion, is made smaller than the total thickness of the double thickness of the first metal plate in the primary sealing portion, and the thickness of the sandwiched member.

At the same time, the total thickness of the first and second metal plates, and the bore ring in the secondary sealing portion, is made larger than the total thickness of the first-third metal plates in the place where the third metal plate is sandwiched.

In a preferred embodiment of the present invention, the metal laminate gasket where the sandwiched member is formed by only the bore ring, the thickness t2 of the second metal plate is made thinner than the thickness t1 of the first metal plate, and the thickness t3 of the third metal plate is made thinner than the thickness t4 of the bore ring.

Also, the bead can be provided in the part sandwiched by the folded portion of the first metal plate in the bore ring. In addition, in another preferred embodiment of the invention, the sandwiched member can be the bore ring and a hole-rim portion relative to the combustion-chamber hole in the second metal plate.

In the metal laminate gasket with the above-described structure, the primary sealing portion is formed by the folded place of the first metal plate sandwiching the sandwiched member, and the secondary sealing portion is formed by the first and second metal plates in the place wherein the extension portion of the bore ring is sandwiched. As a result, the secondary sealing portion differs from a secondary sealing portion consisting of heat-resisting rubber, and includes excellent heat resistance as in the case with a primary sealing portion consisting of the metal plate.

In the metal laminate gasket, typically, the circumference of the combustion-chamber hole is gas-sealed in the primary sealing portion. However, in the case that the lift of the cylinder head becomes large so that the following capability of the sealing bead in the primary sealing portion cannot carry out gas-sealing, the secondary sealing portion presents an excellent following capability relative to the lift.

Specifically, the secondary sealing portion is located near the primary sealing portion and encloses it. The bead whose height is higher than one or the other surface of the folded place of the first metal plate is provided in at least one of the first and second metal plates in the place wherein the extension portion of the bore ring is sandwiched.

In addition, the total thickness of the first and second metal plates and the bore ring in the secondary sealing portion is made smaller than the total thickness of the double thickness of the first metal plate in the primary sealing portion; and the thickness of the sandwiched member. As a result, the elastic resilience of the secondary sealing portion is larger than the elastic resilience of the primary sealing portion so that the secondary sealing portion includes an excellent following capability relative to the lift compared to the primary sealing portion.

Also, in the secondary sealing portion, the total thickness of the first and second metal plates and the bore ring in the extension portion of the bore ring is made smaller than the total thickness of the double thickness of the first metal plate in the primary sealing portion, and the thickness of the sandwiched member. At the same time, the total thickness of the first and second metal plates and the bore ring in the extension portion of the bore ring is made larger than the total thickness of the first-third metal plates in the place where the third metal plate is sandwiched.

As a result, the load balance relative to the primary sealing portion, secondary sealing portion, and the sealing portions around the various types of holes whose circumferences should be sealed in the metal laminate gasket can be appropriately distributed.

According to the metal laminate gasket of the present invention described above, a metal laminate gasket is provided whose following capability for the lift of the cylinder head is improved. More specifically, the metal laminate gasket can ensure the following capability by the secondary sealing portion with heat resistance when the cylinder head is widely lifted. At the same time, the load balance relative to the primary sealing portion, secondary sealing portion, and the sealing portions around the various types of holes whose circumferences should be sealed can be appropriately distributed.

DETAILED DESCRIPTION OF THE PREFERRED EMBODIMENTS

Figure 1:
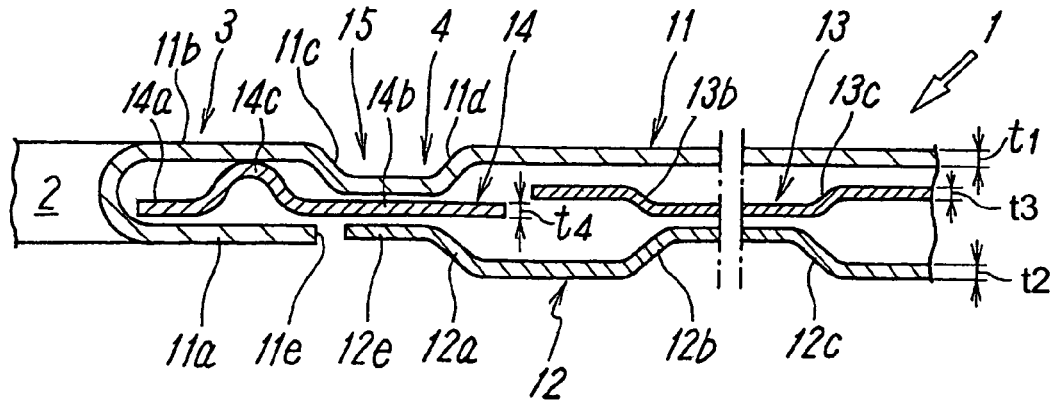
FIG. 1 is a substantial cross-sectional view of a first embodiment of a metal laminate gasket according to the present invention.

FIG. 1 shows a cross-sectional shape of the circumference of a combustion-chamber hole 2 in a first embodiment of a metal laminate gasket according to the present invention. A metal laminate gasket 1 is formed by laminating the first, second, and third metal plates 11, 12, 13 in whole, and includes the combustion-chamber hole 2 corresponding to a combustion chamber of a cylinder block and a hole (not shown in the figure) corresponding to a fluid hole whose circumference should be sealed.

Also, in the rim of the combustion-chamber hole 2 of the metal laminate gasket 1, the first metal plate 11 constituting one side of an outer plate of the gasket is folded back, and a sandwich portion 14a of a bore ring 14 consisting of a ring-shaped metal plate is sandwiched in a folded portion 11a. At the same time, the second metal plate 12 constituting another outer plate is laminated on the face of the folded side of the first metal plate 11, and an extension portion 14b of the bore ring 14 projecting outside of the folded portion 11a is sandwiched between the first metal plate 11 and second metal plate 12. Also, the third metal plate 13 is sandwiched in the range of not overlapping with the bore ring 14.

More specifically, the metal laminate gasket 1 constitutes a folded place of the first metal plate 11 by: the folded portion 11a of the first metal plate 11; and a metal-plate portion 11b located in such a way as to face the folded portion 11a which is a non-folded side of the first metal plate 11. Also, the sandwich portion 14a of the bore ring 14 which is a sandwiched member is sandwiched by the folded portion 11a and the metal-plate portion 11b in the folded place.

Also, in the sandwich portion 14a of the bore ring 14, a circular sealing bead 14c which is concentric with the combustion-chamber hole 2 and encloses the combustion-chamber hole 2 is formed with a full bead. Also, in the first metal plate 11, in the place where the extension portion 14b of the bore ring 14 is sandwiched, two circular sealing beads 11c, 11d which are concentric with the combustion-chamber hole 2 and slope in the opposite direction to each other are formed with a half bead. A circular depression 15 enclosing the sealing bead 14c is provided between the two half beads 11c, 11d.

Also, in the second metal plate 12, a sealing bead 12a which is concentric with the combustion-chamber hole 2 and slopes in a direction opposite to the sealing bead 11d is formed with a half bead in a location opposed to the sealing bead 11d in the place wherein the extension portion 14b of the bore ring 14 is sandwiched. The height of the sealing bead 12a is higher than the height of the surface of the folded portion 11a of the first metal plate 11. Also, even in the case in which the metal laminate gasket 1 is fastened between the cylinder block and a cylinder head by a fastening bolt so that the sealing bead 12a is crushed, the height of the sealing bead 12a is higher than the height corresponding to the expected lift of the cylinder head.

Also, in the second metal plate 12, sealing beads (half beads) 12b, 12c are provided in a place where the third metal plate 13 is sandwiched. In the third metal plate 13, sealing beads (half beads) 13b, 13c sloping in directions opposite to the sealing beads 12b, 12c are provided in locations opposed to the sealing beads (half beads) 12b, 12c.

In addition, as shown in FIG. 1, a hole-rim portion 12e relative to the combustion-chamber hole 2 of the second metal plate 12 is provided in a location overlapping a part of the extension portion 14b of the bore ring 14 located near an edge 11e of the folded portion 11a of the first metal plate 11. The hole-rim portion 12e is not sandwiched by the folded portion 11a of the first metal plate 11.

Also, in the metal laminate gasket 1, a primary sealing portion 3 is formed by the folded place of the first metal plate 11 sandwiching the bore ring 14. A secondary sealing portion 4 encloses the primary sealing portion 3 by the first and second metal plates 11, 12 in a place where the extension portion 14b of the bore ring 14 is sandwiched. The total thickness (t1+t2+t4) of a thickness t1 of the first metal plate 11 in the secondary sealing portion 4; a thickness t2 of the second metal plate 12; and a thickness t4 of the bore ring 14 is made smaller than the total thickness (2 t1+t4) of the double thickness 2 t1 of the first metal plate 11 in the primary sealing portion 3; and the thickness t4 of the bore ring 14.

At the same time, the total thickness (t1+t2+t4) of the thickness t1 of the first metal plate 11 in the secondary sealing portion 4; the thickness t2 of the second metal plate 12; and the thickness t4 of the bore ring 14 is made larger than the total thickness (t1+t2+t3) of the first-third metal plates 11-13 in the place where the third metal plate is sandwiched. In such case, the thickness t2 of the second metal plate 12 can be made thinner than the thickness t1 of the first metal plate 11, and the thickness t3 of the third metal plate 13 can be made thinner than the thickness t4 of the bore ring 14.

The metal laminate gasket 1 with the above-described structure forms: the primary sealing portion 3 by the folded place of the first metal plate 11 sandwiching the bore ring 14; and the secondary sealing portion 4 by the first and second-metal plates 11, 12 in the place wherein the extension portion 14b of the bore ring 14 is sandwiched. As a result, the secondary sealing portion 4 includes excellent heat resistance in a similar fashion with the primary sealing portion 3 consisting of the metal plate and differs from a secondary sealing portion consisting of heat-resisting rubber.

In the metal laminate gasket 1, typically, the circumference of the combustion-chamber hole 2 is gas-sealed in the primary sealing portion 3. However, in the case that the lift of the cylinder head becomes large so that the following capability of the sealing bead in the primary sealing portion 3 cannot carry out gas-sealing, the secondary sealing portion 4 presents the excellent following capability relative to the lift.

Specifically, in the secondary sealing portion 4, the total thickness (t1+t2+t4) of the thickness t1 of the first metal plate 11 in the secondary sealing portion 4; the thickness t2 of the second metal plate 12; and the thickness t4 of the bore ring 14 is made smaller than the total thickness (2 t1+t4) of the double thickness 2 t1 of the first metal plate 11 in the primary sealing portion 3; and the thickness t4 of the bore ring 14. As a result, the rigidity of the secondary sealing portion 4 is made smaller than the rigidity of the primary sealing portion 3.

In addition, the bead 12a whose height is higher than the surface of the folded portion 11a of the first metal plate 11 is provided in the metal plate 12 in the place where the extension portion 14b of the bore ring 14 is sandwiched. As a result, even in the case that the elastic resilience of the secondary sealing portion 4 is larger than the elastic resilience of the primary sealing portion so that the primary sealing portion 3 can not follow the lift of the cylinder head any more, the secondary sealing portion 4 follows the lift and carries out the gas-sealing.

Also, in the secondary sealing portion 4, the total thickness (t1+t2+t4) of the thickness t1 of the first metal plate 11 in the extension portion 14b of the bore ring 14; the thickness t2 of the second metal plate 12; and the thickness t4 of the bore ring 14 is made smaller than the total thickness (2 t1+t4) of the double thickness 2 t1 of the first metal plate 11 in the folded portion of the first metal plate 11; and the thickness t4 of the bore ring 14.

At the same time, the total thickness (t1+t2+t4) of the thickness t1 of the first metal plate 11 in the extension portion 14b of the bore ring 14; the thickness t2 of the second metal plate 12; and the thickness t4 of the bore ring 14 is made larger than the total thickness (t1+t2+t3) of the first-third metal plates 11-13 in the range of not overlapping with the bore ring 14.

As a result, the load balance relative to the primary sealing portion 3, secondary sealing portion 4, and the sealing portions around various types of holes (not shown in the figure) whose circumferences should be sealed in the metal laminate gasket 1 can be appropriately distributed.

Figure 2:
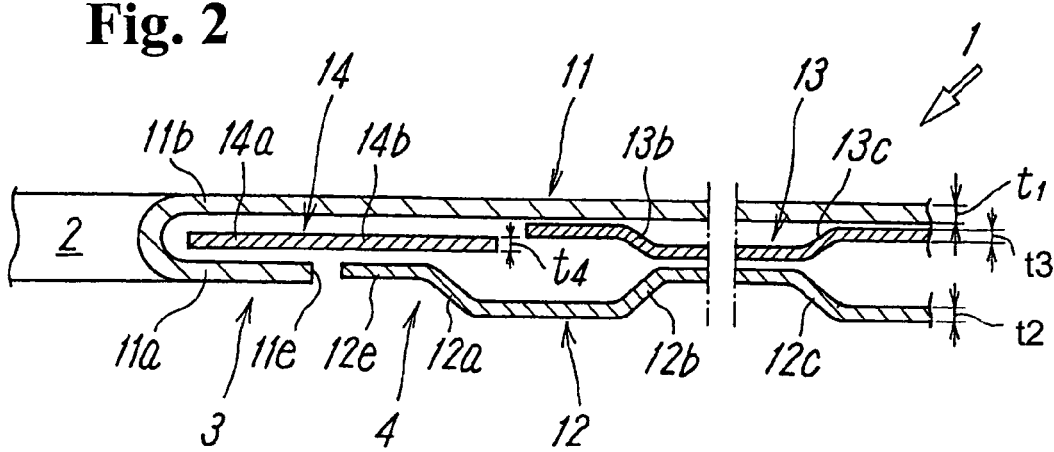
FIG. 2 is a substantial cross-sectional view of a second embodiment of the metal laminate gasket according to the present invention.

FIG. 2 shows the cross-sectional shape of the circumference of the combustion-chamber hole 2 in a second embodiment of the metal laminate gasket according to the present invention. The second embodiment differs from the first embodiment in the following points, however, other structures are the same as those of the first embodiment.

The first point is that the sealing bead is not provided in the bore ring 14 in the primary sealing portion 3. The second point is that the sealing beads are not provided in the first metal plate 11 in the secondary sealing portion 4. In the second embodiment, the sealing bead is not provided in the bore ring 14 of the primary sealing portion 3 and the first metal plate 11 in the secondary sealing portion 4, so that the structure of the metal laminate gasket 1 becomes simple compared to the structure of the first embodiment, and can be easily manufactured.

Figure 3:
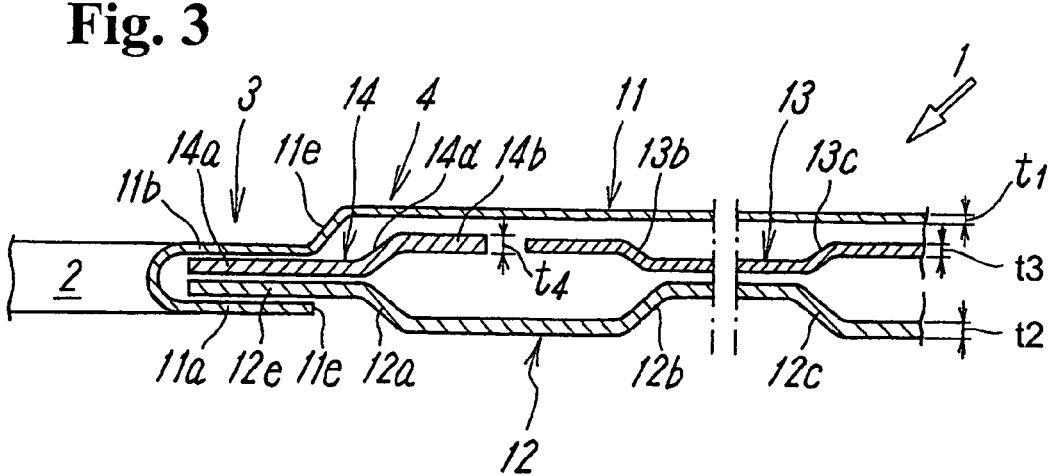
FIG. 3 is a substantial cross-sectional view of a third embodiment of the metal laminate gasket according to the present invention.

FIG. 3 shows the cross-sectional shape of the circumference of the combustion-chamber hole 2 in a third embodiment of the metal laminate gasket according to the present invention. The third embodiment differs from the first embodiment in the following points (a)-(d), however, other structures are the same as those of the first embodiment.

(a) In the first embodiment, the sandwiched member sandwiched in the folded place of the first metal plate 11 is only the bore ring 14. However, in the third embodiment, the bore ring 14 and the hole-rim portion 12e relative to the combustion-chamber hole 2 in the second metal plate 12 are sandwiched in the folded place of the first metal plate 11. As a result, the total thickness of the metal plates 11, 12 and the bore ring 14 in the primary sealing portion 3 becomes (2 t1+t2+t4), and has a thickness that increases by just the thickness t2 of the second metal plate 12 compared to the case of the first embodiment.

(b) The bore ring 14 forms a circular sealing bead 14d in the extension portion 14b. The sealing bead 14d is concentric with the half bead 12a of the second metal plate 12 and slopes in the opposite direction of the half bead 12a from the same radial position with the half bead 12a. The sealing bead is not formed in the sandwich portion 14a.

(c) The first metal plate 11 includes the sealing bead (half bead) 11e whose height is higher than the surface of the metal-plate portion 11b which slopes toward the upper side of the extension portion 14b from near the border with the metal-plate portion 11b in the place wherein the extension portion 14b of the bore ring 14 is sandwiched. The sealing beads 11c, 11d and the circular depression 15 in the first embodiment are not provided.

(d) The thickness t1 of the first metal plate is made thinner than the thickness t2 of the second metal plate.

In the third embodiment, the sealing bead 11e whose height is higher than the metal-plate portion 11b of the folded place of the first metal plate 11 is provided even in the first metal plate 11 in the place where the extension portion 14b is sandwiched, in addition to the sealing bead 12a provided in the metal plate 12. Moreover, the circular sealing bead 14d is formed in the extension portion 14b of the bore ring 14, is concentric with the half bead 12a of the second metal plate 12, and slopes in the opposite direction of the half bead 12a from the same radial position with the half bead 12a. As a result, the following capability relative to the lift of the cylinder head is additionally improved.

Also, in the third embodiment, the sandwich portion 14a of the bore ring 14 and the hole-rim portion 12e of the second metal plate 12 are sandwiched by: the folded portion 11a in the folded place of the first metal plate 11; and the metal-plate portion 11b. As a result, the binding between the first metal plate 11 and the second metal plate 12 can be increased.

Also, in the third embodiment, the total thickness of the metal plates 11, 12, and the bore ring 14 in the primary sealing portion 3 has a thickness that increases by just the thickness t2 of the second metal plate 12 relative to the first embodiment. Even in that case, the thickness t1 of the first metal plate is made thinner than the thickness t2 of the second metal plate so that the increase of the total thickness (2 t1+t2+t4) of the metal plates 11, 12, and the bore ring 14 in the primary sealing portion 3 can be restrained.

The disclosure of Japanese Patent Application No. 2005-020284 filed on Jan. 27, 2005, is incorporated herein.

What is claimed is:

1. A metal laminate gasket for an internal combustion engine comprising:
   a first metal plate having a base portion for constituting one side of the gasket, a curved portion extending from the base portion for defining a combustion hole, and a folded portion extending from the curved portion,
   a ring member having a sandwiched portion disposed between the base portion and the folded portion to form a primary sealing portion together with the first metal plate, and an extension portion outside the sandwiched portion to project outside the folded portion,
   a second metal plate constituting another side of the gasket and disposed on a side of the folded portion, said second metal plate sandwiching the extension portion together with the base portion of the first metal plate to provide a secondary sealing portion,
   a third metal plate disposed outside the ring member and sandwiched between the base portion and the second metal plate, and
   at least one bead formed on at least one of the first and second metal plates at a portion where the extension portion is provided, said at least one bead having a height higher than either surface of the folded portion of the first metal plate,
   wherein a total thickness of the first and second metal plates and the ring member in the secondary sealing portion is less than a total thickness of a double thickness of the first metal plate and a thickness of the sandwiched portion in the primary sealing portion, and greater than a total thickness of the first to third metal plates in a portion where the third metal plate is sandwiched.

2. A metal laminate gasket according to claim 1, wherein said sandwiched portion of the ring member includes a ring bead located between the folded portion and the base portion and projecting toward the base portion, and said base portion includes a base bead projecting toward the extension portion outside the folded portion.

3. A metal laminate gasket according to claim 2, wherein said base bead includes a base inner half bead and a base outer half bead, and said at least one bead is a half bead at a position corresponding to the base outer half bead and projecting in a direction opposite to the base outer half bead.

4. A metal laminate gasket according to claim 3, wherein said second metal plate further includes a second bead, and said third metal plates further includes a third bead, said second and third beads forming an additional sealing portion outside the secondary sealing portion.

5. A metal laminate gasket according to claim 4, wherein said second bead is formed by two second half beads, and said third bead is formed by two third half beads facing the two second half beads.

6. A metal laminated gasket according to claim 1, wherein said ring member is formed of a flat annular ring, and a thickness of the second metal plate is thinner than a thickness of the first metal plate, and a thickness of the third metal plate is thinner than a thickness of the ring member.

7. A metal laminate gasket according to claim 6, wherein said at least one bead is a half bead projecting in a direction away from the base portion.

8. A metal laminate gasket according to claim 7, wherein said second metal plate further includes a second bead, and said third metal plates further includes a third bead, said second and third beads forming an additional sealing portion outside the secondary sealing portion.

9. A metal laminated gasket according to claim 1, wherein said base portion has a base half bead projecting in a direction away from the folded portion, and said ring member has a ring half bead at the extension portion projecting toward the base portion, said ring half bead being located outside the base half bead.

10. A metal laminate gasket according to claim 9, wherein said at least one bead is a half bead projecting in a direction away from the base portion.

11. A metal laminate gasket according to claim 10, wherein said second metal plate further includes a second bead, and said third metal plates further includes a third bead, said second and third beads forming an additional sealing portion outside the secondary sealing portion.

* * * * *